US009151695B2

(12) United States Patent
Worden et al.

(10) Patent No.: US 9,151,695 B2
(45) Date of Patent: Oct. 6, 2015

(54) SYSTEMS AND METHODS FOR DIAGNOSING AN ENGINE

(75) Inventors: Bret Dwayne Worden, Erie, PA (US); Jason M. Strode, Lawrence Park, PA (US); Milan Karunaratne, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 693 days.

(21) Appl. No.: 13/526,787

(22) Filed: Jun. 19, 2012

(65) Prior Publication Data

US 2013/0338899 A1    Dec. 19, 2013

(51) Int. Cl.
*G01M 15/00* (2006.01)
*G01M 15/09* (2006.01)
*F01P 11/18* (2006.01)
*G01M 3/02* (2006.01)
*G01M 3/32* (2006.01)
*F02D 28/00* (2006.01)

(52) U.S. Cl.
CPC ............... *G01M 15/09* (2013.01); *F01P 11/18* (2013.01); *G01M 3/025* (2013.01); *G01M 3/3227* (2013.01); *F01P 2031/18* (2013.01); *F02D 28/00* (2013.01)

(58) Field of Classification Search
CPC ... F01P 11/18; F01P 2025/04; F01P 2031/00; G01M 15/042; G01M 15/09
USPC ........................................................... 73/40
See application file for complete search history.

(56) References Cited

U.S. PATENT DOCUMENTS

| 6,244,256 | B1 * | 6/2001 | Wall et al. ................. 123/568.12 |
| 6,663,349 | B1 | 12/2003 | Discenzo et al. |
| 6,757,665 | B1 | 6/2004 | Unsworth et al. |
| 7,000,467 | B2 * | 2/2006 | Chu et al. ......................... 73/299 |
| 7,069,883 | B2 * | 7/2006 | Atkins ......................... 123/41.81 |
| 7,673,591 | B2 * | 3/2010 | Vuk ............................. 123/41.02 |
| 8,649,931 | B2 * | 2/2014 | Nishizawa .................... 701/32.8 |
| 8,751,101 | B2 * | 6/2014 | Weber et al. .................. 701/34.4 |
| 8,875,561 | B2 * | 11/2014 | Worden et al. .................... 73/40 |
| 2002/0123856 | A1 | 9/2002 | Eryurek |
| 2010/0269574 | A1 | 10/2010 | Zeqiri |
| 2011/0125361 | A1 * | 5/2011 | Weber et al. ..................... 701/29 |
| 2014/0283588 | A1 * | 9/2014 | Weber et al. ............... 73/114.68 |

OTHER PUBLICATIONS

Faculty of Mechanical Engineering, University of Ljubljana, Aškerčeva 6, 1000, Ljubljana, Sloveniaf1mirko.cudina@fs.uni-lj.sif1; Received Feb. 26, 2002. Accepted Jul. 25, 2002. Available online Aug. 13, 2003.

Machinery Health, Prevent Pump Damage through Automatic Detection of Cavitation, Todd Reeves, Emerson Process Management, Pumps & Systems, May 2007 Issue.

* cited by examiner

*Primary Examiner* — Freddie Kirkland, III
(74) *Attorney, Agent, or Firm* — GE Global Patent Operation

(57) ABSTRACT

Presently disclosed are methods and systems for detecting and diagnosing a coolant leak of an engine. A method may include diagnosing a coolant leak of the engine based on a low frequency pressure response of a measured engine coolant pressure. A vehicle system is also disclosed, including an engine, a coolant system operatively connected to the engine. The coolant system includes a coolant reserve and a coolant pump between the engine and the coolant reserve. The vehicle also includes a coolant pressure sensor to measure coolant pressure, and a controller configured to measure an engine coolant pressure and diagnose a coolant leak of the coolant system based on a low frequency pressure response of the measured engine coolant pressure.

25 Claims, 5 Drawing Sheets

SYSTEMS AND METHODS FOR DIAGNOSING AN ENGINE

TECHNICAL FIELD

The present disclosure relates to systems and methods for diagnosing an engine. Other embodiments relate to systems and methods for diagnosing a coolant leak of an engine.

BACKGROUND

Coolant leaks have long been a major contributor to engine shutdowns or degradation of engine components operated at undesirably high temperatures. In some applications, when the coolant level falls below a critical level, the engine will derate power and then shut off to protect itself from overheating. This unexpected shutdown causes delay, and for vehicle systems may interfere with other traffic. If an engine is allowed to run without proper cooling, damage to the engine could occur, resulting in expensive and time consuming repairs. At present, there remains a need for adaptive or threshold based methods and systems to detect the presence of coolant leaks in engines before engine coolant falls below a critical level.

BRIEF DESCRIPTION

In embodiments, a method for an engine is disclosed. The method includes diagnosing a coolant leak of the engine based on a low frequency pressure response of a measured engine coolant pressure.

In an embodiment, the low frequency pressure response corresponds to a loss of prime stability of a coolant pump of the engine. In another embodiment, the low frequency pressure response has a frequency no greater than 1% of a blade frequency of the coolant pump.

In another embodiment, the coolant leak is diagnosed based on the low frequency pressure response including at least a designated number of pressure deviations greater than a designated threshold within a designated time interval. In an embodiment, the method further includes identifying each of the pressure deviations as comprising an increase in the measured engine coolant pressure and a decrease in the measured engine coolant pressure. In an embodiment, the designated threshold is a rate of change of the monitored engine coolant pressure of at least 68900 Pascal per second (about at least 10 psi per second). In another embodiment, the designated number of pressure deviations is three and the designated time interval is one minute.

In another embodiment, the method includes determining the low frequency pressure response of the measured engine coolant pressure by determining a rate of change of the measured engine coolant pressure over time. In an embodiment, the method also includes comparing the determined rate of change of the measured engine coolant pressure with a designated threshold to identify a pressure deviation, wherein the coolant leak is diagnosed at least in part based on the pressure deviation that is identified. In another embodiment, the method also includes identifying a pressure deviation as a change in the polarity of the determined rate of change of the measured engine coolant pressure, wherein the coolant leak is diagnosed at least in part based on the pressure deviation that is identified. In another embodiment, the method also includes determining the low frequency pressure response of the measured engine coolant pressure from a frequency analysis of the measured engine coolant pressure over a selected time interval.

In embodiments, the method may include pumping coolant from a coolant source to a coolant draw in a closed-volume coolant circuit, detecting a pump operating speed, and measuring the engine coolant pressure at the designated pump operating speed. In embodiments, the method may include measuring the engine coolant pressure at an outlet to a pump disposed in a coolant circuit of the engine, sampling the measured engine coolant pressure at a specified operating speed of the pump, and/or continuously monitoring the measured engine coolant pressure during transitions between at least two operating speeds of a coolant pump of the engine. In yet other embodiments, the method may include generating a signal in response to diagnosing the coolant leak based on the low frequency pressure response of the measured engine coolant pressure, wherein the signal corresponds to a severity level of the coolant leak. In yet another embodiment, the method includes notifying personnel via one or more of an audio alarm, a visual alarm, a text message, an email, an instant message, a phone call, or an electronic signal in response to diagnosing the coolant leak based on the low frequency pressure response of the measured engine coolant pressure.

Also disclosed is a method that includes receiving a signal from a coolant pressure sensor corresponding to a sensed engine coolant pressure of engine coolant of an engine system of a vehicle; based at least in part on the signal, determining a low frequency pressure response of the sensed engine coolant pressure; determining whether the low frequency pressure response meets one or more criteria indicative of a coolant leak of the engine system; and if the low frequency pressure response meets the one or more criteria, communicating a signal indicative of the coolant leak for at least one of controlling the vehicle or alerting an entity of the coolant leak.

Also disclosed is a vehicle system. In an embodiment, the vehicle system includes an engine; a coolant system operatively connected to the engine, the coolant system having a coolant reserve and a coolant pump, wherein the coolant pump is disposed between the coolant reserve and the engine; a coolant pressure sensor configured to measure engine coolant pressure; and a controller configured to receive a signal from the coolant pressure sensor corresponding to the measured engine coolant pressure; and diagnose a coolant leak of the vehicle system based on a low frequency pressure response of the measured engine coolant pressure.

Also disclosed is a controller configured to receive a signal corresponding to a measured engine coolant pressure; determine a low frequency pressure response of the measured engine coolant pressure; and diagnose a coolant leak based on the low frequency pressure response of the measured engine coolant pressure.

BRIEF DESCRIPTION OF THE DRAWINGS

The invention will be understood from reading the following description of non-limiting embodiments, with reference to the attached drawings, wherein below.

DETAILED DESCRIPTION

Embodiments of the subject matter disclosed herein relate to systems and methods for diagnosing an engine, and in some embodiment diagnosing a coolant leak of an engine. The engine may be included in a vehicle, such as a locomotive system. Other suitable types of vehicles may include on-highway vehicles, off-highway vehicles, mining equipment, aircraft, and marine vessels. Other embodiments of the invention may be used for stationary engines, such as wind turbines or power generators. The engine may be a diesel engine, or may combust another fuel or combination of fuels. Such alternative fuels may include gasoline, kerosene, biodiesel, natural gas, and ethanol—as well as combinations of the foregoing. Suitable engines may use compression ignition and/or spark ignition. The engines may also be in fluid communication with a coolant system of the vehicle. The coolant system may be pressurized. These vehicles may include an engine with components that degrade with use.

Furthermore, embodiments of the subject matter disclosed herein use data, such as measured coolant pressure, to diagnose conditions of an engine or auxiliary equipment and to distinguish between conditions of the engine or coolant system. Some embodiments diagnose a coolant leak of an engine based on a low frequency pressure response of a measured engine coolant pressure. In certain embodiments, the low frequency pressure response corresponds to a loss of prime stability of a coolant pump in a coolant system operatively connected to an engine.

An engine may be put in a particular operating condition or mode when looking for particular types of engine degradation or measuring coolant pressure. For example, the engine may be diagnosed during a self-loaded condition as part of a test procedure, a dynamic brake (db) setup condition, or a steady state motoring condition. The diagnostic and prognostic methods discussed herein can be used for trending, comparing conditions over time, performing test procedures, repair confirmation, and aid in repair. In some embodiments, coolant pressure data may be sampled when the engine or coolant pump reaches a selected operating speed, condition or state during normal operation.

Figure 1:
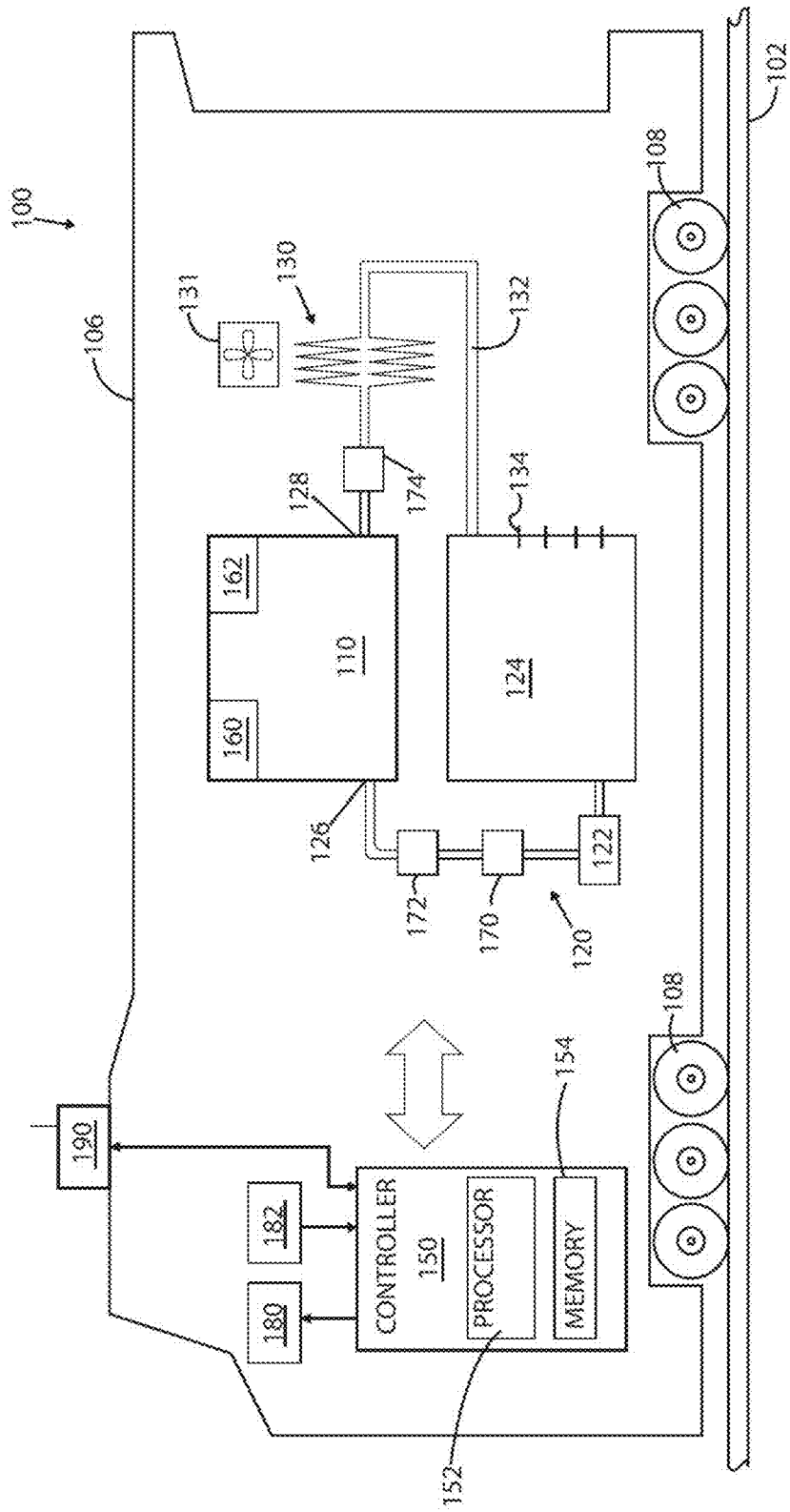
FIG. 1 is an illustration of an exemplary embodiment of a vehicle system (e.g., a locomotive system), having an engine and a coolant system, depicted as a rail vehicle configured to run on a rail via a plurality of wheels.

FIG. 1 is an illustration of an exemplary embodiment of a vehicle system 100 (e.g., a locomotive system) herein depicted as a rail vehicle 106 configured to run on a rail 102 via a plurality of wheels 108. As depicted, the rail vehicle 106 includes an engine 110 operatively connected to a coolant system 120. The vehicle 106 further includes various auxiliary systems or equipment operatively connected to a generator (not shown) or the engine 110 for performing various functions.

The vehicle 106 further includes a controller 150 to control various components related to the vehicle system 100. In one example, controller 150 includes a computer control system. In one embodiment, the computer control system is largely software-based and includes a processor, such as processor 152, configured to execute computer operable instructions. The controller 150 may include multiple engine control units (ECU) and the control system may be distributed among each of the ECUs. The controller 150 further includes computer readable storage media, such as memory 154, including instructions (e.g., computer executable instructions) for enabling on-board monitoring and control of rail vehicle operation. Memory 154 may include volatile and non-volatile memory storage. In accordance with another embodiment, the controller may be hardware-based using, for example, digital signal processors (DSPs) or other hardware logic circuitry to perform the various functions described herein.

The controller may oversee control and management of the vehicle system 100. The controller may receive a signal from a speed sensor 160 of the engine, from an engine inlet coolant pressure sensor 170, or from various other sensors through the vehicle system 100 to determine operating parameters and operating conditions. For example, the controller 150 may also receive a signal from an engine coolant inlet temperatures sensor 172 and an engine coolant outlet temperature sensor 174. Correspondingly, the controller may control the vehicle system 100 by sending commands to adjust various engine actuators 162 to control operation of the rail vehicle 106, including various components such as traction motors, alternator, cylinder valves, throttle, and a coolant pump 122. The wires associated with the signals from various sensors may be bundled together into one or more wiring harnesses to reduce space in the vehicle system 100 devoted to wiring and to protect the signal wires from abrasion and vibration.

The controller may include onboard electronic diagnostics for recording operational characteristics of the engine. Operational characteristics may include measurements from the speed sensor 160, the coolant pressure sensor 170, and/or the temperature sensors, for example. In one embodiment, the operational characteristics may be stored in a database in memory 154. In one embodiment, current operational characteristics may be compared to past operational characteristics to determine trends of engine performance.

The controller may include onboard electronic diagnostics for identifying and recording potential degradation and failures of components of the vehicle system 100. One condition that may be diagnosed is a coolant leak from the coolant system 120. For example, when a coolant leak is identified, a diagnostic code may be stored in a memory 154. In one embodiment, a unique diagnostic code may correspond to each condition that may be identified by the controller. For example, a first diagnostic code may indicate a measured coolant pressure below a threshold corresponding to a warning level, a second diagnostic code may indicate a problem with the coolant pump 122, a third diagnostic code may indicate a problem with a coolant level sensors in the coolant reserve, etc. . . .

The controller may be further linked to a display 180, such as a diagnostic interface display, providing a user interface to the locomotive operating crew and a maintenance crew. The controller may control the engine in response to operator input via user input controls 182, by sending a command to correspondingly adjust various engine actuators 162. Non-limiting examples of user input controls 182 may include a throttle control, a braking control, a keyboard, and a power switch. Further, operational characteristics of the engine and auxiliary equipment, such as diagnostic codes corresponding to degraded components, may be reported via display 180 to the operator and/or the maintenance crew.

The vehicle system may include a communications system 190 linked to the controller. In one embodiment, communications system 190 may include a radio and an antenna for transmitting and receiving voice and data messages. For example, data communications may be between the vehicle system and a control center of a railroad, another locomotive, a satellite, and/or a wayside device, such as a railroad switch. For example, the controller may estimate geographic coordinates of the vehicle system using signals from a GPS receiver. As another example, the controller may transmit operational characteristics of the engine and/or auxiliary equipment to the control center via a message transmitted from communications system 190. In one embodiment, a message may be transmitted to a command center by communications system 190 when a coolant leak of the engine is detected and the vehicle system may be scheduled for maintenance.

Various auxiliary equipment may be operatively coupled to and driven by a rotating engine shaft. Other auxiliary equipment is driven by an engine-driven generator. Examples of such auxiliary equipment include a blower, a compressor, and a radiator fan 131. In accordance with certain embodiments, the generator may actually be one or more generators, such as, for example, a main generator to drive the traction motors and an auxiliary generator to drive a portion of the auxiliary equipment. Further examples of auxiliary equipment include turbochargers, pumps, and engine cooling systems.

The vehicle system 100 includes a coolant system 120 operatively connected to the engine 110. The coolant system 120 is in fluid communication with the engine allowing coolant to flow through the engine and to the radiator 130 to dissipate heat. The coolant may be water or other commercially available coolants. In certain embodiments, the coolant system 120 includes a coolant pump 122. The coolant pump 122 may be mechanically driven from the rotating shaft of the engine 110. Alternatively, the coolant pump 122 may be electrically driven from a generator or an alternator of the vehicle system. The coolant pump 122 pumps coolant through the engine. The pressure of the coolant entering the engine at the inlet port 126 is measured by the coolant pressure sensor 170. Other coolant pressure sensors may be provided throughout the engine coolant system, such as within the engine or near the pump outlet port 128. In one embodiment, coolant pumped by coolant pump 122 enters the engine at the inlet port 126, circulates through the engine, and exits the engine at the outlet port 128. The inlet port 126 and the outlet port 128 may be ports on an engine block or other portion of the engine adapted for the passage of coolant. The coolant passing through the engine may absorb heat from the engine and carry the heat out of the engine to the radiator 130 where the heat is dissipated to the surrounding environment. In some embodiments, a radiator fan 131 is provided to increase air flow across the radiator 130, thereby increasing the cooling of the coolant passing through the radiator. The coolant may exit the radiator and flow through a return path 132 to a coolant reserve 124. The coolant reserve 124 may be a reservoir provided to store coolant allowing for thermal expansion and contraction. In some embodiments, the coolant reserve 124 may be a tank or an enlarged section of piping. In some embodiments, the coolant system 120 forms a closed circuit in which the coolant is pressurized by pump 122.

The vehicle system 100 may include one or more sensors configured to monitor conditions in the system. For example, the speed sensor 160 measures the speed of the rotating shaft of the engine during operation. The coolant pressure sensor 170 measures the pressure of the coolant in the engine coolant system 120. The coolant pressure may be measured at the coolant pump 122, between the coolant pump and the engine, or within the engine. One or more coolant pressure sensors may be provided at different locations to measure the coolant pressure. The coolant level sensor 134 measures the coolant level in the coolant reserve 124. In some embodiments, the coolant level sensor 134 may be one or more refraction sensors. In other embodiments, the coolant level sensor 134 may be a float level sensor. Suitable commercially available sensors may be selected based on application specific parameters.

Figure 2:
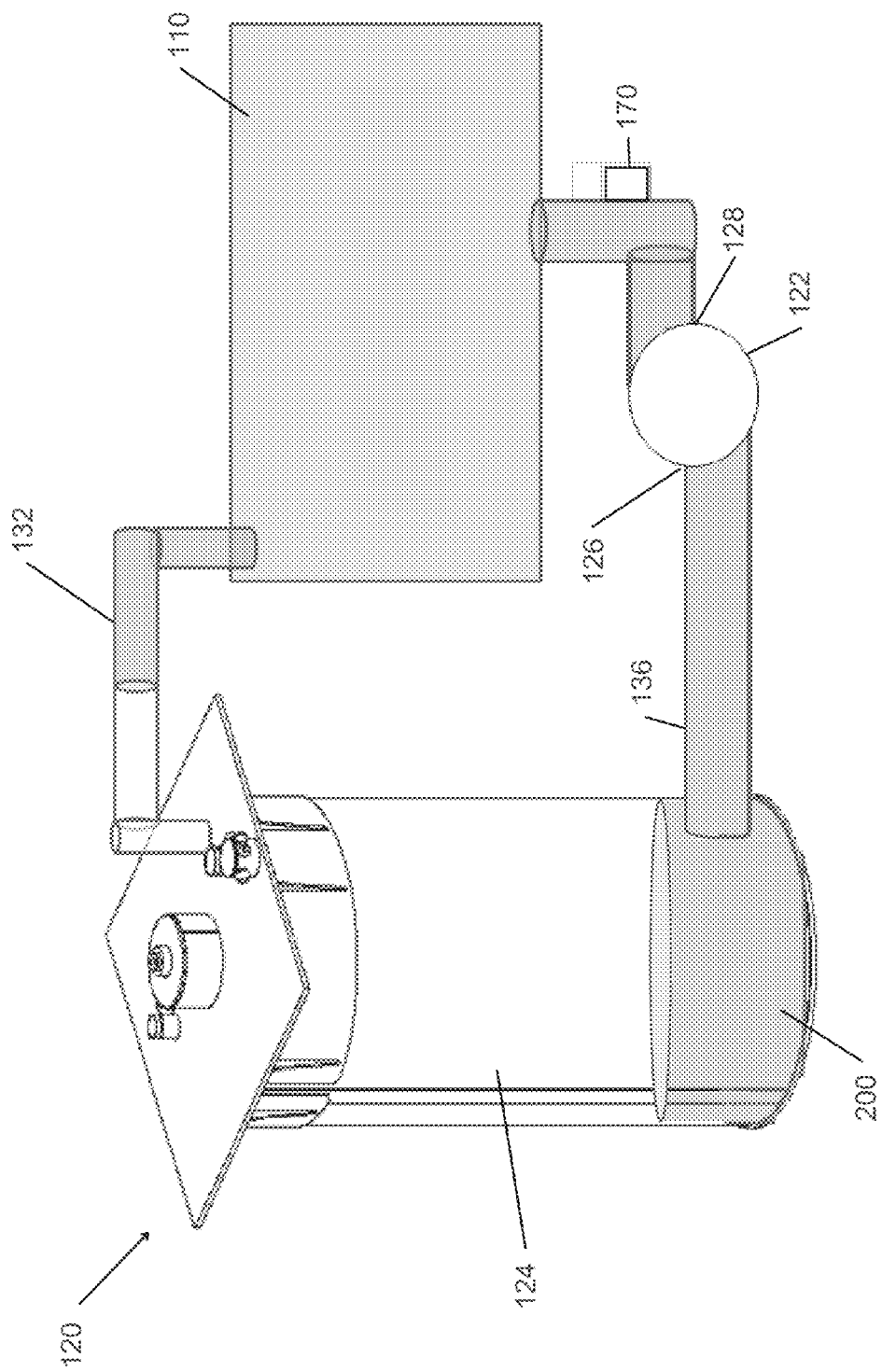
FIG. 2 is an illustration of a coolant system filled with coolant.
Figure 3:
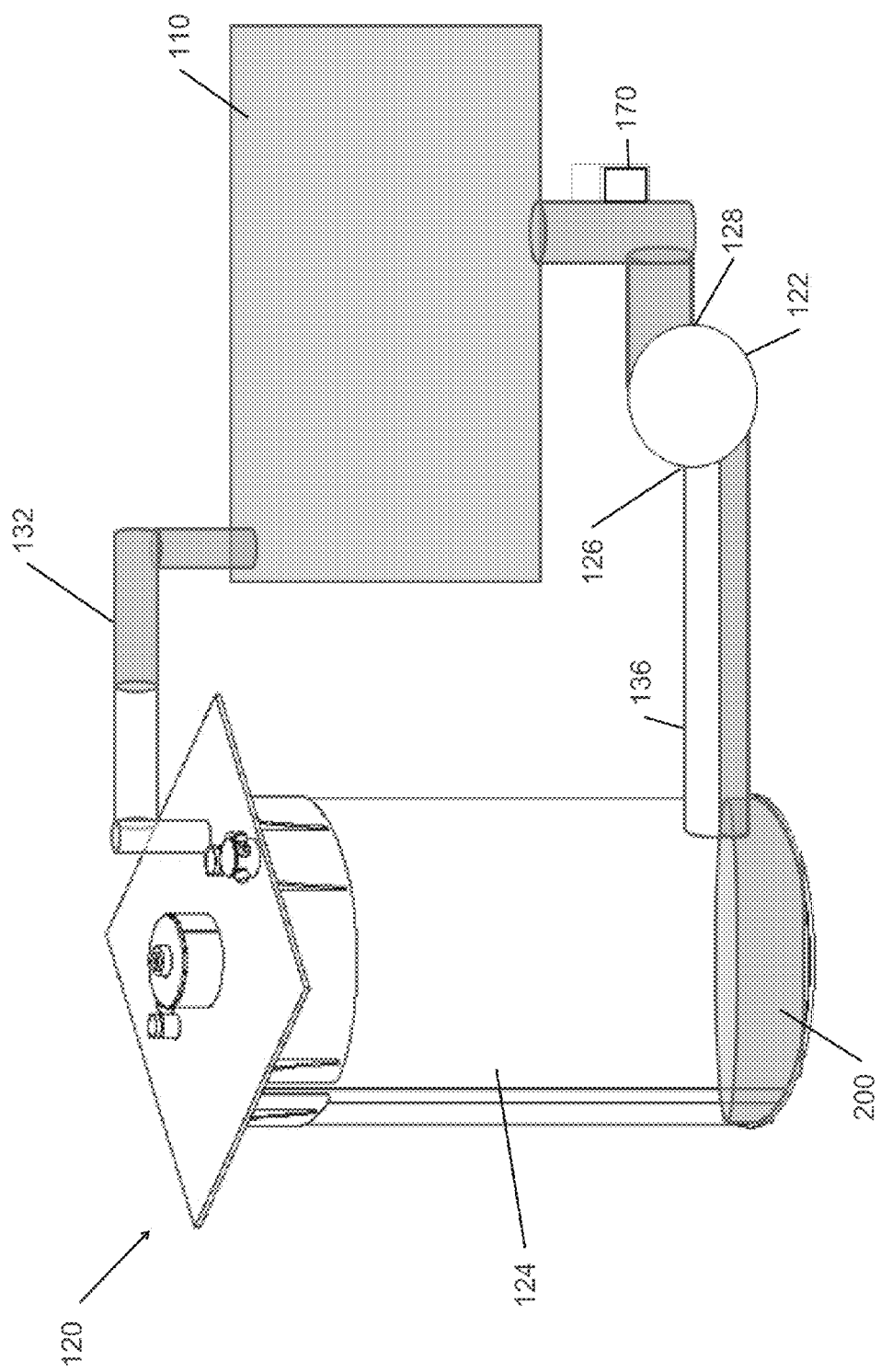
FIG. 3 is an illustration of a coolant system with a leak.

Referring generally to FIGS. 2 through 5, embodiments of a method for an engine are disclosed that include diagnosing a coolant leak of the engine based on a low frequency pressure response of a measured engine coolant pressure. In certain embodiments, the low frequency pressure response corresponds to a loss of prime stability of a coolant pump of the engine. Referring now to FIG. 2, a block illustration of an embodiment of the coolant system 120 of the vehicle system 100 shown in FIG. 1 is shown. The coolant system 120 includes a coolant reserve 124 and a coolant draw, which may include the engine 110, radiators (not shown in FIG. 2), return path 134, and other components in the coolant path. In the embodiment of FIGS. 1-3, the coolant pump 122 is provided between the coolant reserve 124 and engine 110. In other embodiments, however, the coolant pump may be located after the engine or radiator, or may be integrated with the engine, radiator or other components of the coolant system as desired. The coolant pump 122 includes an inlet port 126 in fluid communication with the coolant reserve 124, through a prime path 136. The coolant pump 122 also includes an outlet port 128 in communication with the engine 110. A coolant pressure sensor 170 may be located between the coolant pump 122 and engine 110 for measuring and communicating the outlet pressure of the coolant pump 122 and/or the inlet pressure of the engine 110. In other embodiments, the coolant pressure sensor is located in the prime path 136 between the coolant reserve 124 and the coolant pump 122 and is configured for measuring and communicating the inlet pressure of the coolant pump 122. As shown in FIG. 2, during normal operations, the volume of coolant 200 in the system is expected to be sufficient to fill the coolant draw, while also maintaining a full input or prime for the coolant pump.

When there is a leak condition, however, the amount of coolant 200 in the coolant system 120 is reduced, such as illustrated in FIG. 3. As the volume of coolant is reduced, there may still be sufficient coolant to instantaneously fill the coolant draw, including engine and radiators. Although the coolant draw may remain filled, there may not be sufficient coolant to supply the inlet to the pump, resulting in deviations in a measured engine coolant pressure. The deviations in the measured engine coolant pressure may be detected at the pump inlet or at the pump outlet. These deviations in measured coolant pressure create a low frequency pressure response in the measured engine coolant pressure corresponding to the loss of prime stability of the coolant pump. The loss of prime stability refers to the reduced supply of coolant to the pump resulting in a pressure variation. In embodiments, the reduced supply of coolant may be sufficient to cause intermittent cavitations. In other embodiments, however, the reduced supply does not result in cavitations. In either case, a low frequency pressure response is produced that may be identified and used to diagnose a leak condition of the coolant system. For example, the coolant pressure on the pump inlet may be reduced briefly until sufficient coolant circulates through the coolant system to restore the pump inlet pressure.

Figure 4:
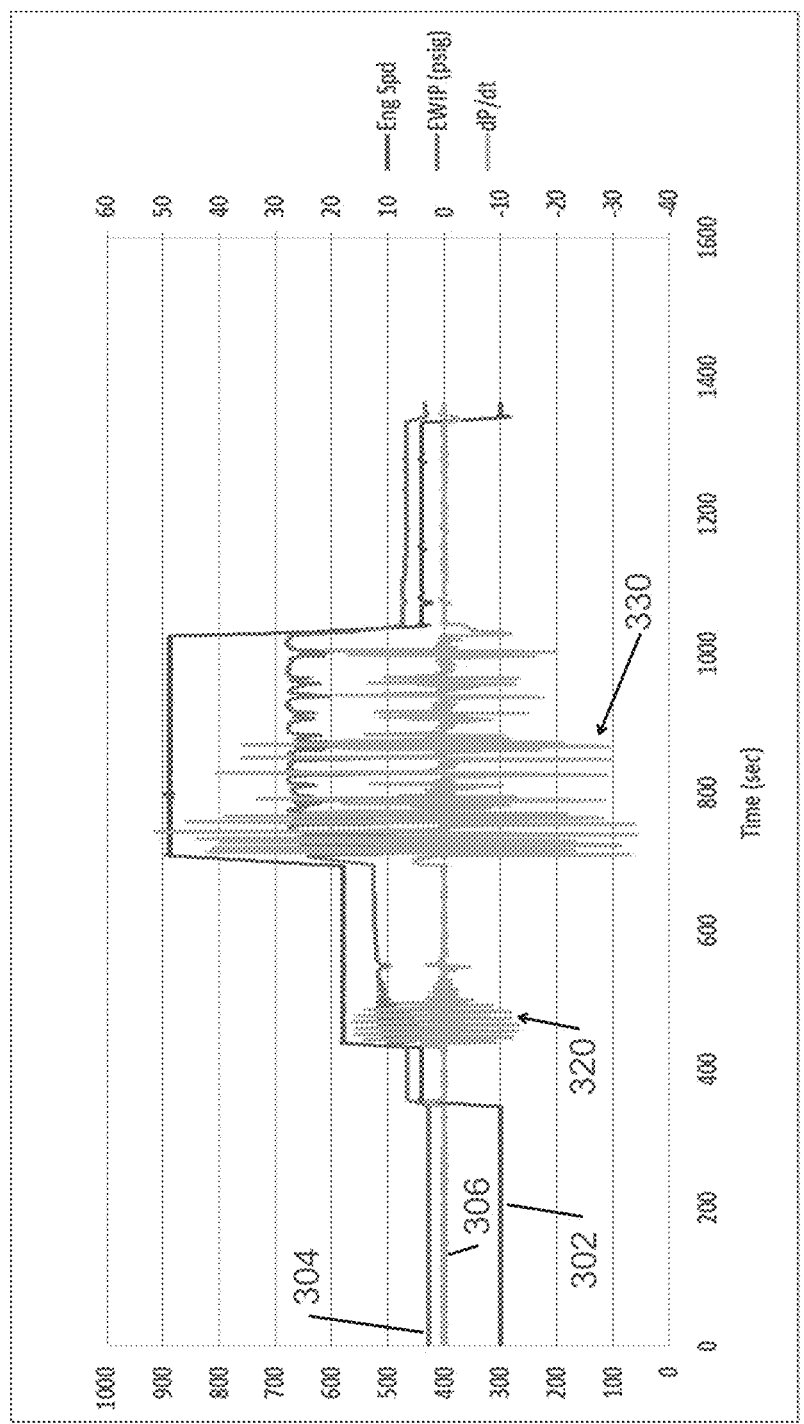
FIG. 4 is an illustration of an exemplary embodiment of measured engine coolant pressure with a coolant leak.

Referring now to FIG. 4, the measured engine coolant pressure is illustrated for various engine operating conditions. The graphs illustrate the low frequency pressure response corresponding to the loss of prime stability of a coolant pump of the engine. As noted above, the measured engine coolant pressure may be measured by a coolant pressure sensor positioned on the output of the coolant pump, such as coolant pressure sensor 170. In other embodiments, a coolant pressure sensor on the input to the coolant pump may be used. The difference between the input and output pressures of the coolant pump may be correlated with the operating speed of the coolant pump. Therefore, the method may also include monitoring the operating speed of the coolant pump and compensating for the expected pressure difference associated with the pump operating speed.

The loss of prime stability of the coolant pump occurs when the amount of water available in the coolant reserve 124 is insufficient to meet the demand of the coolant pump 122 which supplies coolant to the engine 110. In one embodiment, the inlet port 126 of the coolant pump 122 may not be fully submerged in the coolant. In another embodiment, the inlet port 126 may take in air in addition to coolant as a result of being partially submerged. In yet other embodiments, the inlet port 126 remains fully submerged but the coolant pressure at the inlet port is reduced resulting in a reduction in the volume of coolant delivered to the pump. In these embodiments, if the pump 122 is not taking in the desired amount of coolant, the pump will not be fully primed, and therefore deviations in the measured coolant pressure will occur, resulting in a low frequency pressure response such as illustrated in FIG. 4.

As used herein, the low frequency pressure response refers to frequencies less than the operating speed of the coolant pump. In addition, the low frequency pressure response refers to the occurrence of identified pressure deviations that occur less frequently than steady state cavitations or other deviations associated with the pump operating speed. By way of illustration, low frequency pressure deviations are generally significantly lower than the rotational or blade frequency of the pump 122, and may be in the range of no more than 5 Hz, no more than 1 Hz, or no more than 0.5 Hz. In other embodiments, the low frequency pressure response may correspond to frequencies no greater than 10%, no greater than 5%, or no greater than 1% of the rotational frequency (or operating speed) of the coolant pump. The rotational frequency of the pump 122 is given by the number of rotations the coolant pump motor completes in one second. In one embodiment, the pump 122 is driven by the engine 110 and therefore the rotational frequency is correlated to engine speed. In other embodiments, the pump 122 may be driven by an electric or other motor, and therefore may not be correlated to engine speed. The blade frequency of the pump 122 is given by the number of blades that pass by a fixed point in one second, and is determined by the rotational frequency and number of blades on the pump. For example, a pump with six blades operating at 1200 rpm would have a rotational frequency of 20 Hz, and a blade frequency of 120 Hz. In one embodiment, a low frequency pressure response has a frequency of no greater than 1% of the blade frequency of a coolant pump. In the above, example with a blade frequency, the low frequency pressure response would be limited to no more than 1.2 Hz.

The low frequency pressure response is therefore distinguishable from the high frequency indications of frequent or steady state cavitations that have previously been detected by measuring vibration, often at frequencies associated with the rotational or blade frequencies. The frequent or steady state cavitations have often been associated with stress concentrations on pump blades and therefore produce vibrations corresponding to the blade frequency of the coolant pump. High frequency pressure deviations, such as due to steady state cavitations, have often been at blade frequencies of 100 Hz or greater, and often within the range of 100-10000 Hz depending upon the design of a particular pump. In contrast, intermittent cavitations associated with the loss of prime stability of the coolant pump may manifest as a low frequency pressure response, to the extent that the intermittent cavitations are correlated with the reduction of coolant flowing into the pump. In some embodiments, intermittent cavitations may occur at or near the pump outlet port 128 when there is an insufficient supply of coolant to the coolant pump 122. This intermittent cavitation may occur when the amount of coolant is low, for example if the pressure at the inlet port 126 is less than the vaporization pressure of the coolant entering the inlet port.

In embodiments, the method also includes measuring the engine coolant pressure and determining the low frequency pressure response from the measured engine coolant pressure. Referring now to FIG. 4, the engine coolant pressure 304 is plotted over time in seconds. As shown, a low frequency pressure response corresponding to a loss of pump prime stability occurred following changes in engine speed 302 as illustrated.

The low frequency pressure response may be identified using a variety of methods. In one embodiment, the low frequency pressure response includes a designated number of pressure deviations greater than a designated threshold within a designated time interval. In one embodiment, the designated values are predetermined. In other embodiments, the designated values are calculated based on operational parameters, such as pump operating speed or average coolant pressure. A pressure deviation may be identified by an increase in the measured engine coolant pressure and a decrease in the measured engine coolant pressure. In some embodiments, identifying both an increase and decrease in engine coolant pressure is used to filter out changes in coolant pressure associated with changes in the operating speed of the pump. As shown on FIG. 4, when the engine speed 302 is increased the coolant pressure 304 also increases due to the increased operating speed of the coolant pump. These increases due to changes in pump operating speed are not necessarily indicative of a loss of pump prime stability and therefore may be excluded when identifying pressure deviations.

The pressure deviations may also be compared to a designated threshold to determine which variations in pressure are of sufficient magnitude to identify a potential loss of pump prime stability. In some embodiments, the threshold is a rate of change of the monitored engine coolant pressure of at least 68900 Pascal per second or about 10 psi per second. In other embodiments, a different threshold such as at least at least 34450 Pascal per second (about 5 psi per second) or at least 103350 Pascal per second (about 15 psi per second) may be used, depending upon the needs of the system and the desired sensitivity to potential faults. In this context, the threshold is an absolute value, such that an increase or decrease exceeding, for example, 10 psi per second (about 68900 Pascal per second) is considered to be a deviation contributing to the low frequency pressure response. As shown on FIG. 3, the rate of change of the monitored engine coolant pressure over time (dP/dt) 306 may be calculated and used to identify the low frequency pressure response. In this manner, determining the low frequency pressure response of the measured engine coolant pressure includes determining a rate of change of the measured engine coolant pressure, and comparing the determined rate of change of the measured engine coolant pressure with a designated threshold to identify a pressure deviation. The coolant leak is diagnosed at least in part based on the pressure deviation that is identified. In other embodiments, the threshold may be a determined change in the magnitude of the measured engine coolant pressure and the method may account for sampling rate and pump operating speed to the extent necessary in determining the threshold indicative of a loss of pump prime stability. In either case, as the pump prime is lost and then restored, deviations in the monitored engine coolant pressure are created and identified as exceeding the designated threshold. In one example, a low frequency pressure response is identified when three pressure deviations are identified within a time interval of one minute. In this example, the low frequency may be approximately 0.05 Hz, and is substantially below the rotational or blade frequency of the coolant pump.

In yet another embodiment, a pressure deviation is identified as a change in the polarity of the determined rate of change of the measured engine coolant pressure. The polarity of the rate of change indicates whether the measured pressure is increasing or decreasing. By monitoring the polarity, the method may account for changes in pump operating speed, such as those associated with engine speed changes as discussed above.

In many embodiments, a low frequency pressure response is identified by analyzing a time domain representation of the measured engine coolant pressure, such as based on the magnitude or rate of change of pressure deviations. In other embodiments, the low frequency pressure response of the measured engine coolant pressure is determined from a frequency analysis of the measured engine coolant pressure over a selected time interval. As noted above, the variations in pressure corresponding to a loss of pump prime stability occur at time intervals which are relatively larger than the variations in pressure associated with normal operation or steady state cavitations of the coolant pump. A low frequency pressure response may therefore be identified by analyzing the frequency content of the measured engine coolant pressure in the low frequency range, such as less than 5 Hz, less than 1 Hz or less than 0.5 Hz. In this manner, a low frequency pressure response may be identified using a coolant pressure sensor having a sample rate substantially less than the rotational frequency of the coolant pump. In one embodiment, a coolant pressure sensor has a sample frequency of no more than 50 Hz. In other embodiments, a low pass filter may be applied to the measured engine coolant pressure to remove high frequency variations and assist in isolating the low frequency pressure response associated with a loss of pump prime stability.

As illustrated in FIG. 4, the low frequency pressure response may occur in several forms. A first occurrence 320 of the low frequency pressure response is illustrated following a transition in engine speed 302. When the engine speed increases, the pump speed increases resulting in an increased demand for coolant into the pump. A temporary loss of pump prime stability occurs when the rate of coolant flow through the engine, radiator and other components is insufficient to maintain the pump prime. The low frequency pressure response is temporary in nature, however, because as the rate of coolant flow increases, the input to the pump returns to a stable level. The low frequency pressure response thus indicates that there is sufficient coolant for steady state operations at the selected engine speed, but that the coolant level is lower than desired indicating a leak condition is be present. Such early indications of coolant loss as indicated by a loss of pump prime stability may enable advanced warning of leaks that were previously not detectable. In other embodiments, the engine speed (or pump speed) is changed to test the stability of the pump prime at different operating speeds. In this manner, an indication of the health of the coolant system may be provided and leaks diagnosed before the coolant loss becomes severe. A second occurrence 330 of the low frequency pressure response is also illustrated following a subsequent change in engine speed. As shown, the second occurrence 330 of the low frequency pressure response continues to occur while the engine remains at the higher speed indicating that the amount of coolant in the system is insufficient to maintain pump prime stability at that operating speed of the pump and engine. Although pump prime stability is not maintained, there may still be enough coolant to instantaneously fill the coolant draw, including the engine and radiators thereby avoiding an engine shutdown. The continued nature of the low frequency pressure response however indicates that the loss of coolant is approaching a level that will produce a low coolant fault, and as such, maintenance should be scheduled to repair and/or refill the coolant system. By continuously monitoring the measured engine coolant pressure during transitions between at least two operating speeds of the engine and/or coolant pump, further diagnostic information may collected regarding the magnitude of the leak condition affecting the engine.

In embodiments of the disclosed method, the measured engine coolant pressure may be measured using a variety of techniques. In one embodiment, the coolant pressure sensor 170 continuously monitors the pressure at the outlet port 128 of the coolant pump 122. The coolant pressure sensor 170 may provide an analog or digital indication of the measured engine coolant pressure. The pressure reading is electronically conveyed to a controller 150 that converts the output to a pressure value and tracks the coolant pressure. For example, the coolant pressure sensor 170 may have a current or voltage-based output that is indicative of the pressure value. Alternatively, the coolant pressure sensor 170 may transmit an oscillating wave having a variable wavelength, frequency, or amplitude that is indicative of the pressure value. In other embodiments, the coolant pressure sensor may be positioned to measure pressure near the inlet port 126 of the coolant pump.

In some embodiments, the controller 150 is provided on a vehicle system, such as illustrated in FIG. 1, and is configured to receive a signal from the coolant pressure sensor corresponding to the measured engine coolant pressure, and diagnose a leak condition of the vehicle system based on a low frequency pressure response of the measured engine coolant pressure. The controller 150 implements one or more of the methods previously described including determining a low frequency pressure response based on a time domain or frequency domain analysis of the measured engine coolant pressure. Upon detecting the low frequency pressure response associated with a loss of prime stability of the coolant pump, the controller may diagnose a leak condition and report the leak condition.

Another embodiment of the disclosed method includes sampling the measured engine coolant pressure at a specified operating speed of the coolant pump. In various embodiments, the presently disclosed method is implemented using sampling rate less than 100 Hz, less than 20 Hz, or less than 5 Hz. In one embodiment, the measured engine coolant pressure is sampled at a rate less than the rotational frequency or operating speed of the coolant pump. As with the previous method, the coolant pressure sensor 170 may electronically communicate a signal indicative of a pressure value to the controller 150. The controller 150 receives the signal, converts it to a pressure value, and compares that pressure value against previous pressure values to determine a change in pump outlet pressure. If the pressure changes according to a low frequency pressure response, for example at least three pressure deviations exceeding 68900 Pascal per second (about 10 psi per second) over one minute, the controller 150 may generate a signal indicating a coolant leak has been identified. A rate of change of the engine coolant pressure data may also be determined by comparing consecutive samples and accounting for the sampling frequency. Due to the low frequency at which a loss of pump prime stability occurs, the coolant pressure may be sampled at relatively low frequencies facilitating the use of existing coolant pressure sensors. In this manner, the methods described herein may be employed on existing vehicles or other systems with little or no hardware changes required reducing the expense associated with monitoring and diagnosing coolant leaks.

The above method of diagnosing coolant leaks may be used alone or in combination with other methods to further clarify the magnitude of a leak or provide other insights useful for maintenance and repair operations. In one embodiment, the low frequency pressure response is monitored over an extended time period, such as several day or weeks. In addition, data may be collected on periodic refills of the coolant system. The refill data may be collected manually or may be collected by identifying fill signatures in the monitored coolant pressure data. The combination of the low frequency pressure response data and the refill data may then be used to assess the rate at which coolant is being lost from the coolant system. In this method, the severity of the leak is determined and may be reported.

In another embodiment, a method for an engine may also include analyzing pressure trends in a closed volume coolant system. Analyzing pressure trends may be used alone or in combination with diagnosing a coolant leak based on the low frequency pressure response of the measured engine coolant pressure. In one embodiment, a closed coolant system has a defined volume. The volume of coolant is generally less than the total volume of the coolant system resulting in a volume of air being maintained in the coolant reserve. An engine coolant inlet pressure sensor may be used to analyze pressure trends of the closed volume system and indicate a leak output. As coolant is lost from the coolant system, the pressure of the air in the coolant reserve 124 may be determined based on the measurements of the coolant pressure. As the volume of coolant is reduced, the air within the coolant reserve will expand, thereby causing a drop in pressure. As a result, the coolant pump discharge pressure will also be reduced due to the reduction of the pressure at the pump inlet. When a noticeable drop in pressure occurs, for example between 48250 and 68900 Pascal (about 7-10 psi), the controller 150 communicates a leak output. The leak output may result in a signal as described above.

In another embodiment, a method for analyzing an engine may also include analyzing determining an elevation head of the fluid in the coolant reserve. In one embodiment, the coolant system is an open system that is vented to atmosphere either during normal operations or upon shutdown of the system. As a result, the pressure at the inlet port of the coolant pump 122 is based on the elevation head, or depth of the coolant in the coolant reserve that is maintained above the inlet port of the coolant pump. An engine coolant pressure sensor at a known location in the coolant system measures the coolant pressure. As coolant is lost due to a leak, the depth of the coolant is reduced resulting in a corresponding reduction in the coolant pressure sensed by the engine coolant pressure sensor. When the coolant is not flowing, a reduction in the engine coolant pressure will correlate to a loss of coolant and indicate a leak condition which may be reported. When coolant is flowing, such as during operation, the pump speed and rate of coolant flow may be determined and the measured coolant pressure may be adjusted to account for the expected pressure increase due to the coolant flow. These measurements may then be used to calculate the elevation head of the coolant relative to the inlet port of the pump. The calculated elevation head may further used to calculate the volume of coolant remaining in the coolant reserve. By monitoring and analyzing this information over time, the existence of a leak may be determined from the reduction in pressure and the inferred reduction in coolant volume in the closed system. In addition, the severity of a leak may be determined based on the calculation of the lost coolant volume.

Figure 5:
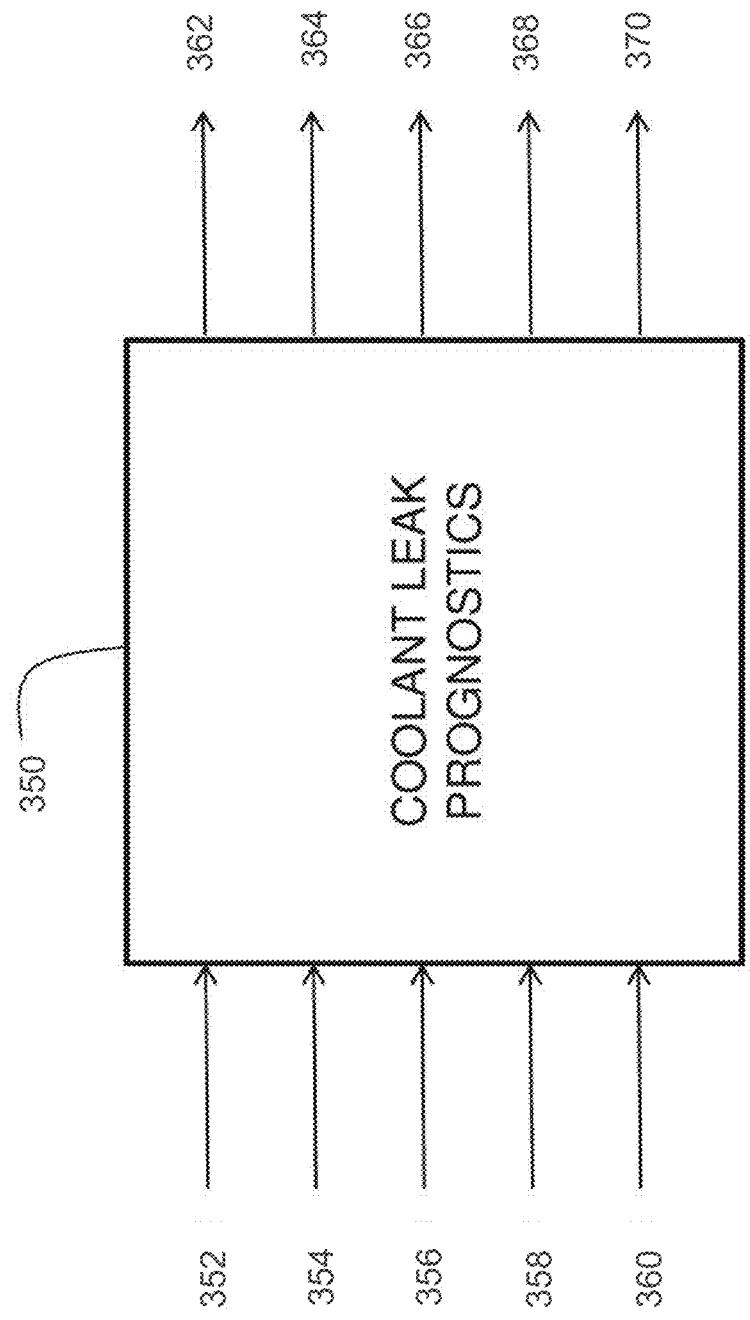
FIG. 5 is an illustration of an exemplary embodiment of a coolant leak prognostics module.

Referring now to FIG. 5, a coolant leak prognostics module (CLP) 350 is provided that implements one or more of the methods and systems presently disclosed. The CLP may be implemented in hardware, software or a combination. In some embodiments, the CLP is implemented on the controller 150 of the vehicle system 100. In yet other embodiments, the CLP is implemented in a test kit including a controller that may be used with multiple vehicle or other systems. In one example, the CLP is implemented as a state machine. As illustrated in FIG. 5, the CLP receives one or more inputs, such as measured engine coolant pressure 352, engine or pump speed 354, measured coolant level 356, engine coolant temperature 358, and/or engine lubrication temperature 360. The input data may be analyzed, compared with current or historical data from other engines, and processed to evaluate the health of the engine coolant system 120. The CLP may implement the methods described above using the measured engine coolant pressure data to diagnose leaks based on the low frequency pressure response associated with a loss of prime stability of the coolant pump. The CLP may produce one or more outputs, such as indications of the low pressure frequency response 362, identified leak signatures 364, alerts 366, or alarms or warning messages 368, and/or operational confidence metrics 370, including the number of day until an expected coolant fault or shutdown.

The methods presently disclosed may also include generating a signal in response to diagnosing a coolant leak based on the low frequency pressure response of the measured engine coolant pressure. The methods may also include alerting an operator or other personnel so that remedial action may be taken. In one embodiment, the generated signal corresponds to a severity level of the coolant leak. For example, a first severity level may correspond to a temporary loss of pump prime stability at a given engine operating speed, such as the first occurrence 320 illustrated in FIG. 4. A second, more severe, severity level may correspond to a continued loss of pump prime stability at a given engine operating speed, such as the second occurrence 330 illustrated in FIG. 4. In some cases, after detecting a significant loss of coolant, the engine speed may be restricted until the coolant system may be refilled and/or repaired.

In other embodiments, the coolant leak may also be reported to a user, such as an operator of the vehicle system. In one embodiment, personnel are notified via one or more of an audio alarm, a visual alarm, a text message, an email, an instant message, a phone call, or an electronic signal in response to diagnosing a coolant leak based on the low frequency pressure response of the measured engine coolant pressure. In still other embodiments, the leak condition may be reported to another controller, person, or computer, such as a remote maintenance and diagnostic system capable of receiving diagnostic information from a range of monitored assets. Each of these systems and methods, including the notification and reporting techniques described above, may also be implemented on a vehicle system such as the rail vehicle 106 described above. In still yet other embodiments, a test kit is provided that includes a controller having a memory and a processor configured to perform the methods described above.

In each of the embodiments presently disclosed, component fault data may be recorded. In one embodiment, component fault data may be stored in a database including historical compressor data. For example, the database may be stored in memory 154 of controller 150. As another example, the database may be stored at a site remote from rail vehicle 106. For example, historical coolant system data may be encapsulated in a message and transmitted with communications system 190. In this manner, a command center may monitor the health of the coolant system in real-time. For example, the command center may perform steps to diagnose the condition of the coolant system using the data transmitted with communications system 190. For example, the command center may receive data including the measured engine coolant pressure from a rail vehicle, the identified low frequency pressure response and data from other sensors, such as the coolant temperature sensors positioned throughout the coolant system. Upon identification of a loss of pump prime stability, the other data may be utilized to further diagnose the nature or source of the coolant leak or facilitate troubleshooting during repair operations. Further, a command center may schedule maintenance and deploy healthy locomotives and maintenance crews in a manner to optimize capital investment based on an identification of locomotives that may be experiencing coolant leaks or other problems. Historical data may be further used to evaluate the health of the coolant system before and after cooling system components are serviced or otherwise modified.

Diagnosing a coolant leak based on the above described methods may allow a leak or other loss of coolant to be detected earlier than when identified with previously available means. In this manner, the methods provide a prognostic or advanced diagnostic indication of the health of the coolant system. In some applications, the vehicle system is permitted to continue operating when a low severity leak is diagnosed. In other applications, the vehicle system may be stopped or maintenance may be promptly scheduled, such as when the coolant leak is severe. In this manner the cost of secondary damage to the engine or other components can be avoided by early and accurate detection.

In yet other embodiments, backup or redundant systems may be available. In an example, a supply of reserve coolant may be available for supply to the coolant system when a leak had been identified. In another example, a system having multiple coolant systems may be configured to allow sharing of coolant between the multiple coolant systems so that a portion of the coolant from a healthy system may be provided to a leaking system until an appropriate repair can be made. The backup systems and processes used can be designed to minimize negative system-wide consequences to operation of a system. This may be especially useful for extending the service of a given system until repairs can be accomplished in a more cost effective manner while protecting the system from further damage due to a loss of coolant.

Another embodiment relates to a method (e.g., method for diagnosing an engine) that includes receiving a signal from a coolant pressure sensor corresponding to a measured engine coolant pressure of engine coolant of an engine system of a vehicle. The method further includes diagnosing a coolant leak of the vehicle system based on a low frequency pressure response of the measured engine coolant pressure.

Another embodiment relates to a method (e.g., method for diagnosing an engine) that includes receiving a signal from a coolant pressure sensor corresponding to a sensed engine coolant pressure of engine coolant of an engine system of a vehicle. The method also includes, based at least in part on the signal, determining a low frequency pressure response of the sensed engine coolant pressure, and determining whether the low frequency pressure response meets one or more criteria (e.g., the criteria may be as described herein) indicative of a coolant leak of the engine system. The method also includes, if the low frequency pressure response meets the one or more criteria, communicating a signal indicative of the coolant leak for at least one of controlling the vehicle or alerting an entity (e.g., control system, human operator, central office) of the coolant leak.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be." The term "instructions" as used herein with respect to a controller or processor may refer to computer executable instructions.

The embodiments described herein are examples of articles, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A method for an engine comprising:
analyzing a measured engine coolant pressure in a frequency range of no more than 5 Hz to determine a low frequency pressure response, and
diagnosing a coolant leak of the engine based on the low frequency pressure response of the measured engine coolant pressure.

2. The method of claim 1, wherein the low frequency pressure response corresponds to a loss of prime stability of a coolant pump of the engine.

3. The method of claim 2, wherein the low frequency pressure response has a frequency no greater than 1% of a blade frequency of the coolant pump.

4. The method of claim 1, wherein the coolant leak is diagnosed based on the low frequency pressure response comprising at least a designated number of pressure deviations greater than a designated threshold within a designated time interval.

5. The method of claim 4 further comprising:
identifying each of the pressure deviations as comprising an increase in the measured engine coolant pressure and a decrease in the measured engine coolant pressure.

6. The method of claim 4, wherein the designated threshold is a rate of change of the monitored engine coolant pressure of at least 68900 Pascal per second.

7. The method of claim 6, wherein the designated number of pressure deviations is three and the designated time interval is one minute.

8. The method of claim 1 further comprising:
determining the low frequency pressure response of the measured engine coolant pressure by determining a rate of change of the measured engine coolant pressure over time.

9. The method of claim 8 further comprising:
comparing the determined rate of change of the measured engine coolant pressure with a designated threshold to identify a pressure deviation, wherein the coolant leak is diagnosed at least in part based on the pressure deviation that is identified.

10. The method of claim 8 further comprising:
identifying a pressure deviation as a change in the polarity of the determined rate of change of the measured engine coolant pressure, wherein the coolant leak is diagnosed at least in part based on the pressure deviation that is identified.

11. The method of claim 1 further comprising:
determining the low frequency pressure response of the measured engine coolant pressure from a frequency analysis of the measured engine coolant pressure over a selected time interval.

12. The method of claim 1 further comprising:
pumping coolant from a coolant source to a coolant draw in a closed-volume coolant circuit, detecting a pump operating speed, and measuring the engine coolant pressure at the pump operating speed.

13. The method of claim 1 further comprising:
measuring the engine coolant pressure at an outlet to a pump disposed in a coolant circuit of the engine.

14. The method of claim 1 further comprising:
sampling the measured engine coolant pressure at a specified operating speed of a coolant pump of the engine.

15. The method of claim 1 further comprising:
continuously monitoring the measured engine coolant pressure during transitions between at least two operating speeds of a coolant pump of the engine.

16. The method of claim 1 further comprising:
generating a signal in response to diagnosing the coolant leak based on the low frequency pressure response of the measured engine coolant pressure, wherein the signal corresponds to a severity level of the coolant leak.

17. The method of claim 1 further comprising:
notifying personnel via one or more of an audio alarm, a visual alarm, a text message, an e-mail, an instant message, a phone call, or an electronic signal in response to diagnosing the coolant leak based on the low frequency pressure response of the measured engine coolant pressure.

18. A method comprising:
receiving a signal from a coolant pressure sensor corresponding to a sensed engine coolant pressure of engine coolant of an engine system of a vehicle;
based at least in part on the signal, determining a low frequency pressure response of the sensed engine coolant pressure by analyzing the sensed engine coolant pressure in a frequency range of no more than 5 Hz;
determining whether the low frequency pressure response meets one or more criteria indicative of a coolant leak of the engine system;
and if the low frequency pressure response meets the one or more criteria, communicating a signal indicative of the coolant leak for at least one of controlling the vehicle or alerting an entity of the coolant leak.

19. A vehicle system comprising:
an engine;
a coolant system operatively connected to the engine, the coolant system having a coolant reserve and a coolant pump, wherein the coolant pump is disposed between the coolant reserve and the engine;
a coolant pressure sensor configured to measure engine coolant pressure; and
a controller configured to:
receive a signal from the coolant pressure sensor corresponding to the measured engine coolant pressure;
analyze the signal corresponding to the measured engine coolant pressure in a frequency range of no more than 5 Hz to determine a low frequency pressure response; and
diagnose a coolant leak of the vehicle system based on the low frequency pressure response of the measured engine coolant pressure.

20. The vehicle system of claim 19, wherein the low frequency pressure response is an indication of a loss of prime stability of a coolant pump.

21. The vehicle system of claim 19, wherein the low frequency pressure response comprises at least a designated number of pressure deviations greater than a designated threshold within a designated time interval.

22. The vehicle system of claim 21, wherein each of the pressure deviations comprises an increase in the measured engine coolant pressure and a decrease in the measured engine coolant pressure.

23. The vehicle system of claim 21, wherein the designated threshold is a rate of change of the monitored pressure of at least 68900 Pascal per second.

24. The vehicle system of claim 21, wherein the designated number of pressure deviations is three and the designated time interval is one minute.

25. A controller configured to:
receive a signal corresponding to a measured engine coolant pressure;
determine a low frequency pressure response of the measured engine coolant pressure by analyzing the sensed engine coolant pressure in a frequency range of no more than 5 Hz; and
diagnose a coolant leak based on the low frequency pressure response of the measured engine coolant pressure.

* * * * *